Figure 8:
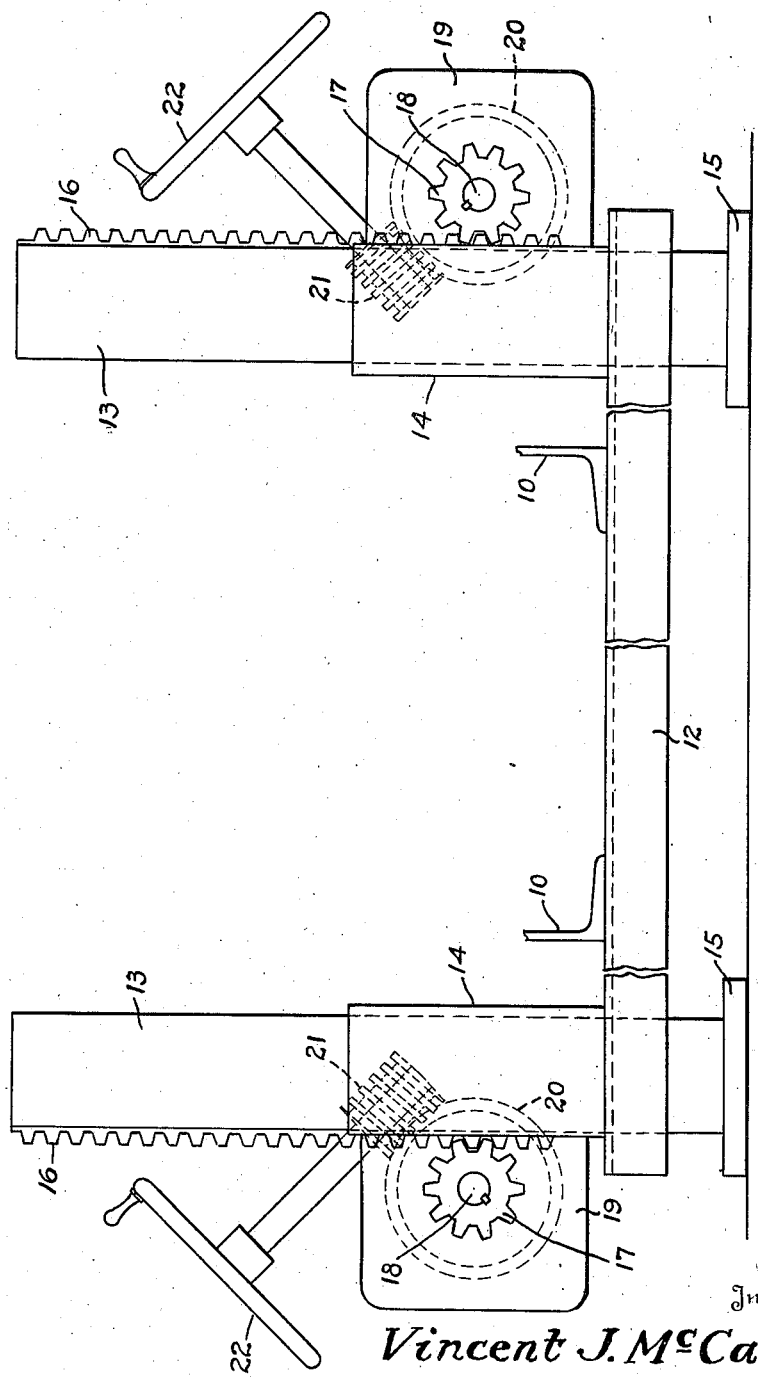

Feb. 5, 1946.    V. J. McCARTHY    2,394,194
EARTH DRILLING MACHINE
Filed April 14, 1944    5 Sheets-Sheet 1
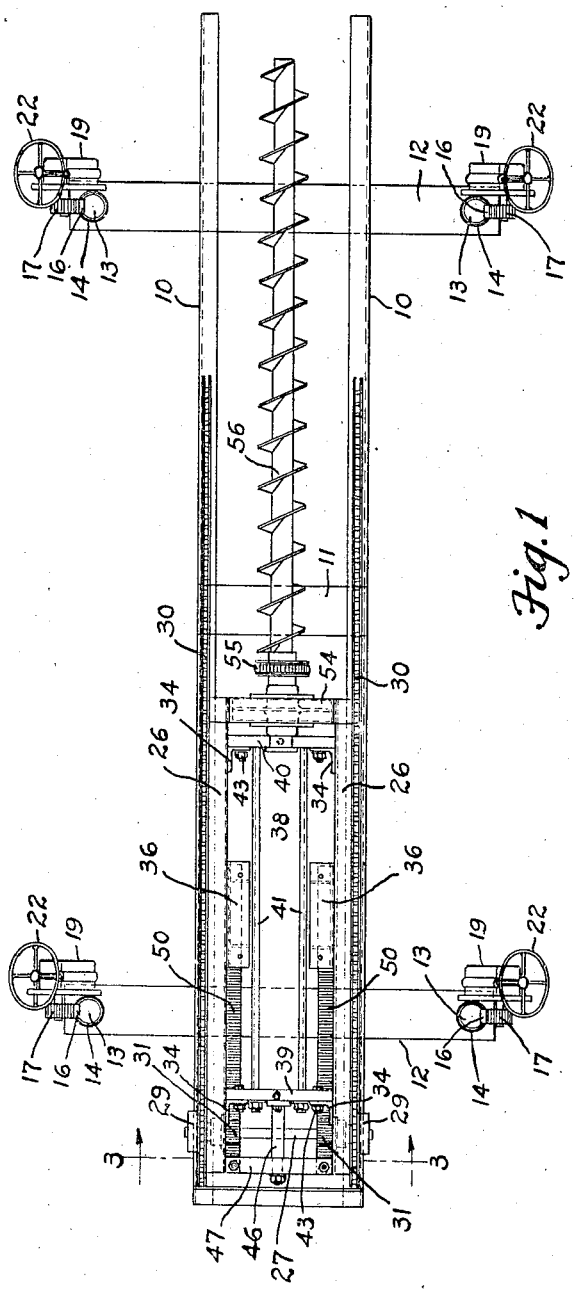
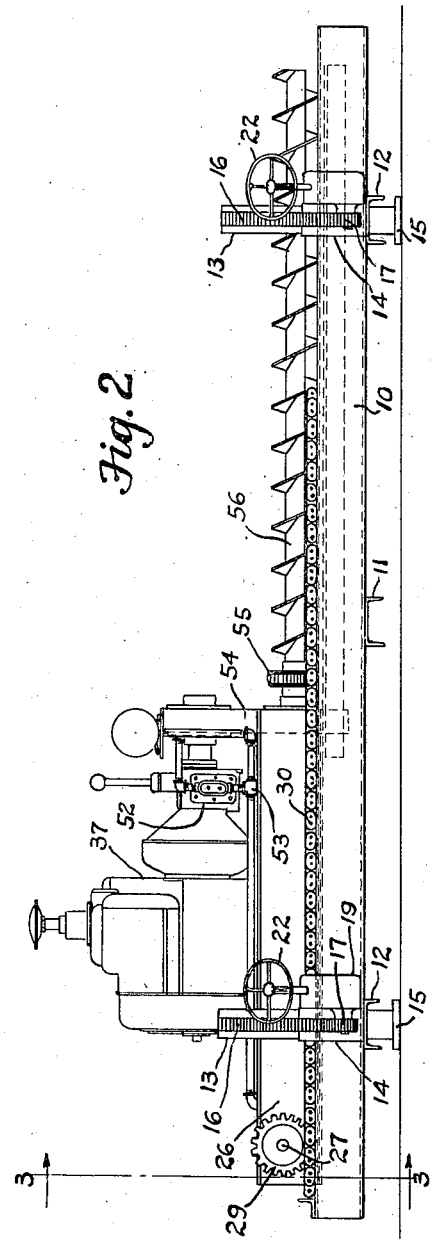
Inventor
*Vincent J. McCarthy*
By *Frease and Bishop*
Attorneys

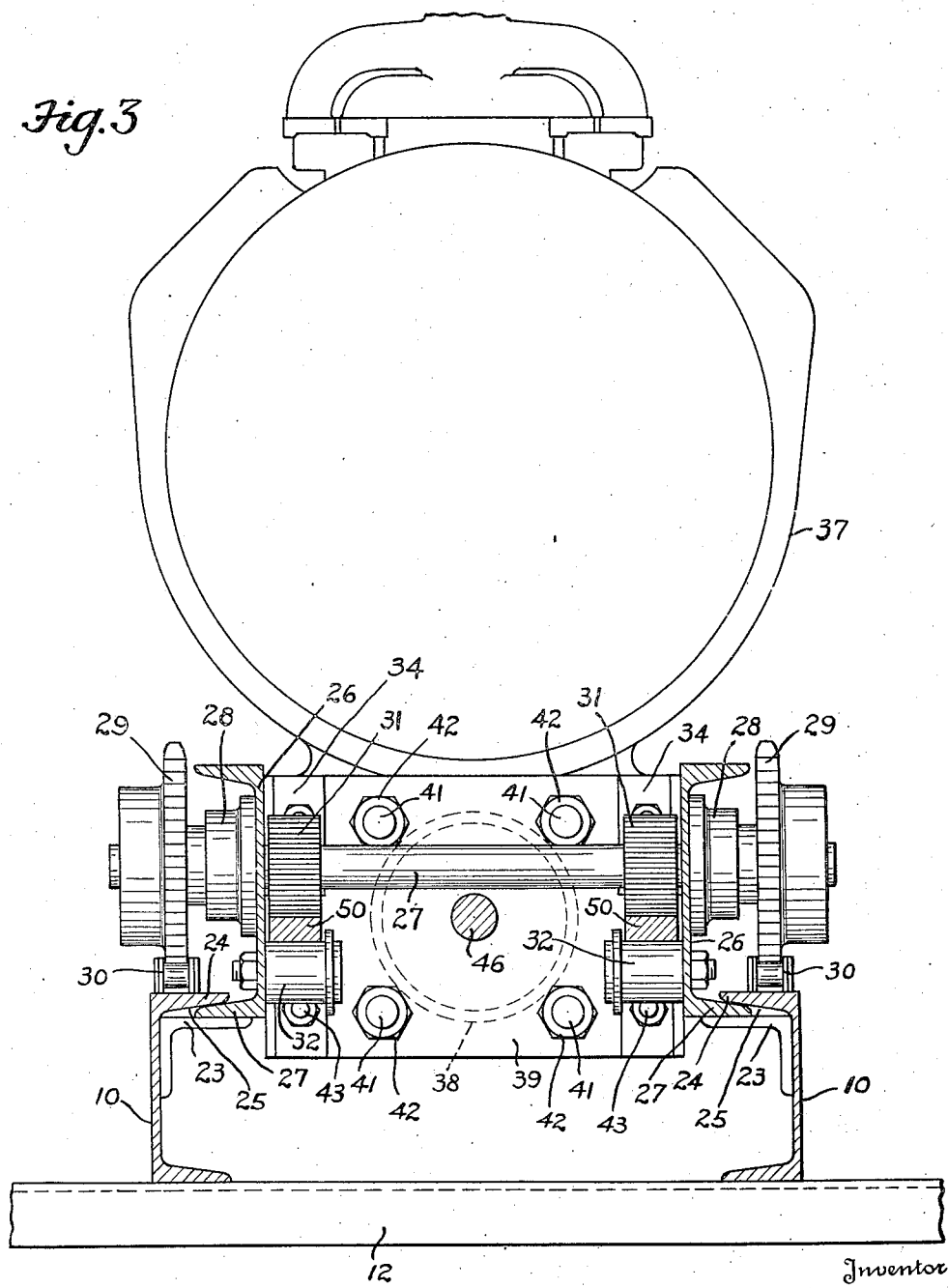

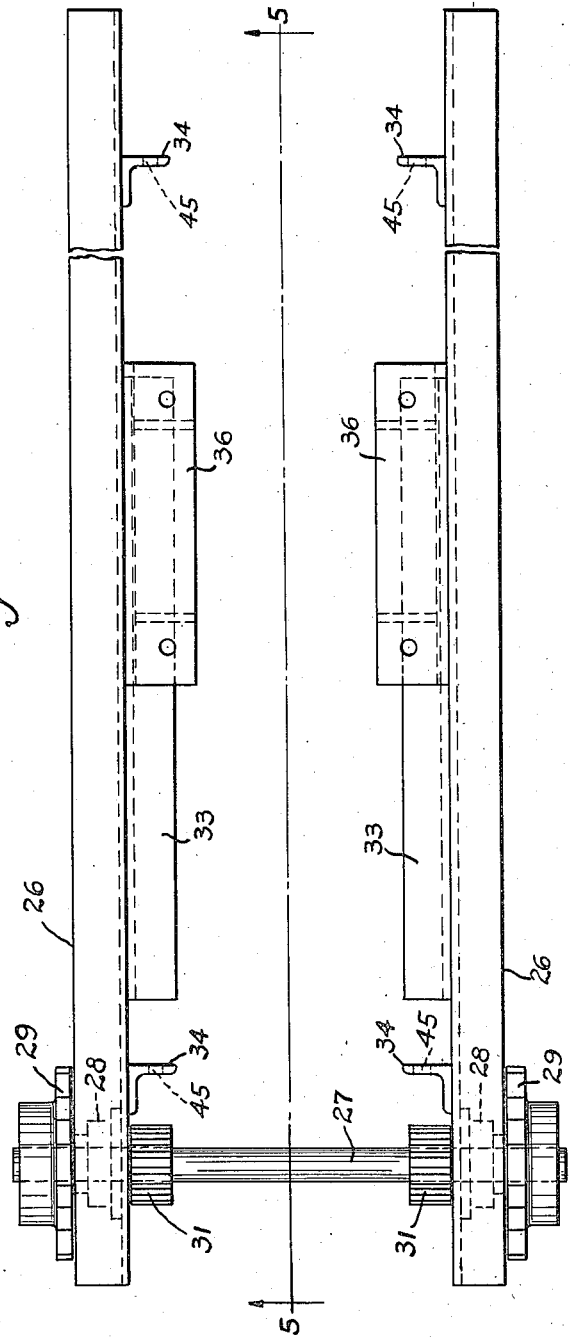

Feb. 5, 1946. V. J. McCARTHY 2,394,194
EARTH DRILLING MACHINE
Filed April 14, 1944 5 Sheets-Sheet 4
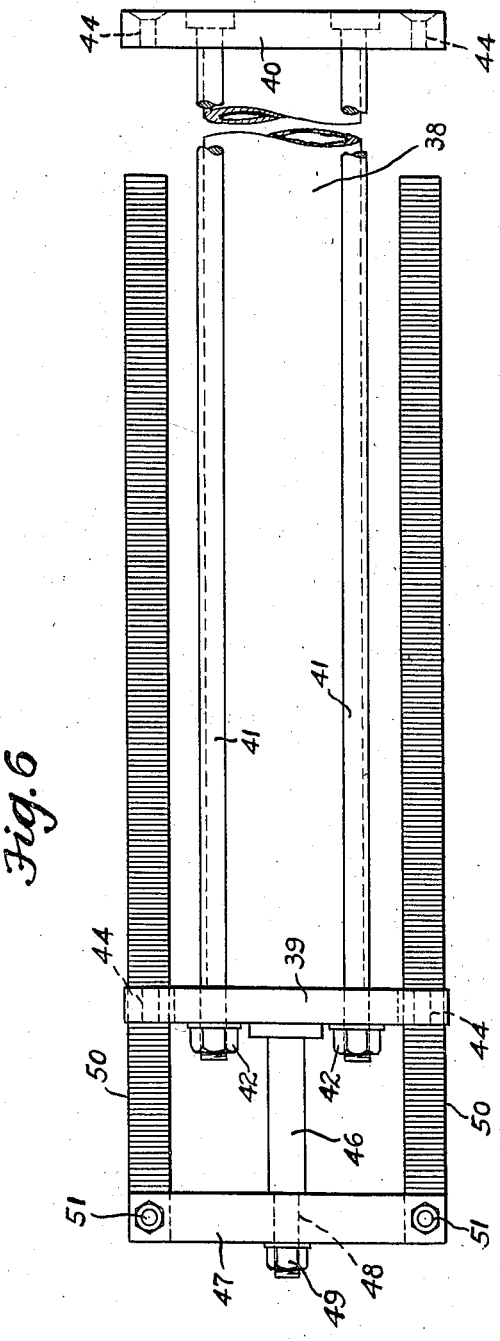
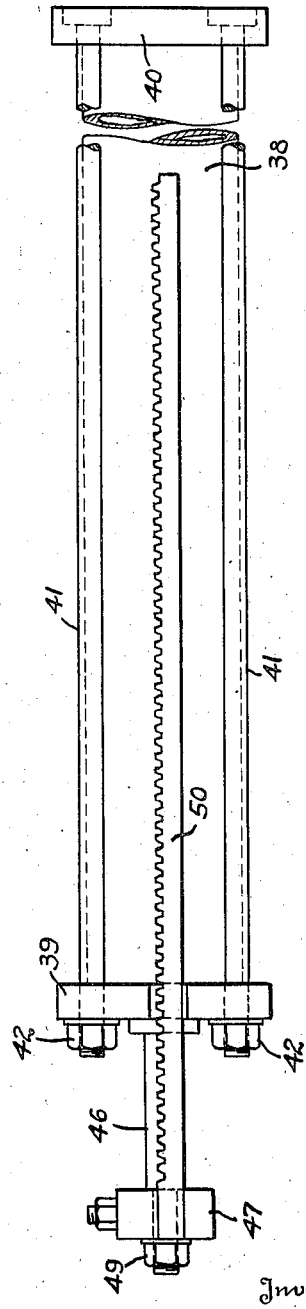
Inventor
Vincent J. McCarthy
By Frease and Bishop
Attorneys Feb. 5, 1946.   V. J. McCARTHY   2,394,194
EARTH DRILLING MACHINE
Filed April 14, 1944   5 Sheets-Sheet 5

Inventor
Vincent J. McCarthy
By Frease and Bishop
Attorneys

Patented Feb. 5, 1946

2,394,194

UNITED STATES PATENT OFFICE 2,394,194

EARTH DRILLING MACHINE

Vincent J. McCarthy, Youngstown, Ohio, assignor to The Salem Tool Company, Salem, Ohio, a corporation of Ohio Application April 14, 1944, Serial No. 530,982

5 Claims. (Cl. 255—22)

The invention relates to machines for boring or drilling through earth or rock formations and the object of the invention is to provide a machine of this character which may be easily transported and rapidly operated.

Another object of the invention is the provision of a drilling machine operated by a hydraulic cylinder and so constructed, that a relatively long stroke of the drill may be obtained with the use of a relatively short cylinder.

A further object is the provision of a drilling machine of this character in which with each operation of the machine the drill is moved a distance equal to substantially twice the length of the cylinder.

A further object is the provision of a machine of this character including a stationary frame upon which is movably mounted a carriage carrying the drill and the engine or other motive power therefor, a hydraulic cylinder being mounted upon said carriage and arranged to move the carriage longitudinally upon the stationary frame through a rack bar frame movable relative to the carriage and to the stationary frame.

A still further object is the provision of a machine of this character in which the carriage is provided with sprocket wheels or gears meshing with racks, which may be in the form of sprocket chains, mounted upon the stationary frame, pinions carried by the carriage meshing with the rack bars upon the movable rack frame, the piston of the hydraulic cylinder being connected to said movable rack frame for imparting longitudinal movement to all of the parts relative to the stationary frame.

Another object is the provision of means for easily and readily adjusting the stationary frame so as to locate the drill at any desired angle.

Still another object is the provision of a machine of this character in which a double action hydraulic cylinder is provided and controlled by a four-way valve so that the drill may be driven into the earth or withdrawn therefrom.

A further object of the invention is to generally improve and simplify drilling or boring machines of this general character and to provide a relatively inexpensive, light, durable and efficient machine which may be easily and rapidly operated.

Still another object is the provision of means for independently adjusting the height of each of the four corner portions of the machine.

The above objects, together with others which will be apparent from the drawings and the following description, or which may be later referred to, may be attained by constructing the improved drilling machine in the manner illustrated in the accompanying drawings, in which:

Figure 1 is a plan view of a drilling machine constructed in accordance with the invention;

Fig. 2 a side elevation of the machine shown in Fig. 1;

Fig. 3 a transverse sectional view through the machine on a larger scale, taken as on the line 3—3, Figs. 1 and 2;

Fig. 4 a detached plan view of the carriage, with the engine removed therefrom;

Fig. 5 a longitudinal sectional view through the carriage, taken as on the line 5—5, Fig. 4;

Fig. 6 a top plan view of the movable rack bar frame and the hydraulic cylinder;

Fig. 7 a side elevation of the rack bar frame and cylinder, and

Fig. 8 an enlarged elevation of the mechanism for vertically adjusting the corner portions of the machine.

The machine is carried upon a stationary frame comprising the two spaced, longitudinally disposed side frame members 10, which may be in the form of channel irons as shown, which are connected at spaced intervals by the transversely disposed channel irons 11 and 12, the endmost members 12 extending a substantial distance beyond each side of the frame members 10.

For the purpose of independently adjusting each corner portion of the machine vertically, mechanism may be provided as shown in detail in Fig. 8. For this purpose a vertical post 13 may be slidably mounted through a tubular bearing sleeve 14 fixed upon each end portion of each member 12, the post having at its lower end a foot 15 for contact with the ground, the floor of a truck, or other substantially horizontal supporting surface.

Rack teeth 16 are formed upon the post 13 and mesh with the pinion 17, which is fixed upon a shaft 18 journalled in the gear housing 19. A worm wheel is fixed upon said shaft, within the gear housing and operated by means of a worm screw 21 which may be provided with a hand wheel 22 for manually rotating said worm screw to raise or lower the adjacent corner portion of the stationary frame upon the post 13.

An angle iron 23 is fixed to the inner side of each of the side frame members 10 at a point spaced from the top flange 24 thereof, forming guide grooves 25 within which the movable carriage is mounted as will be explained.

The carriage includes two side frame members preferably in the form of channel irons 26, located with their flanges disposed outwardly, the lower flange 27 of each side frame being slidably received in the corresponding guide groove 25 of the stationary frame.

A shaft 27 is journalled through bearings 28, mounted upon the outer sides of the carriage side frames 26, and a gear or sprocket wheel 29 is mounted upon each end of the shaft. These gear or sprocket wheels mesh with racks which may be in the form of sprocket chains 30 fixed upon the upper edges of the side members 10 of the stationary frame.

A pair of pinions 31 are fixed upon the shaft 27, between the side frame members 26 of the carriage, and a flanged roller 32 is journalled upon the inner side of each frame member 26 directly below each pinion 31.

A longitudinally disposed angle iron 33 is fixed to the inner side of each frame member 26 of the carriage, the top thereof being substantially in line with the top of the adjacent roller 32.

Vertically disposed angle irons 34 are fixed to the inner sides of the carriage side frames 26, at points near their opposite ends, for attaching a hydraulic cylinder as will be later described, and the rear angle iron on each side frame is cut away intermediate its upper and lower ends, as at 35, to accommodate the movable rack bar frame as will be later explained.

Pads 36 are connected to the inner sides of the frames 26 of the carriage, near their upper edges, to support the engine indicated generally at 37.

The hydraulic cylinder 38 is provided with the heads 39 and 40 at opposite ends thereof which are attached thereto as by the tie rods 41 located through suitable apertures in the heads and drawn tightly together upon opposite ends of the cylinder by the nuts 42.

For the purpose of mounting the cylinder upon the carriage the heads 39 and 40 of the cylinder are attached to the vertical angle irons 34 of the carriage as by bolts 43 located through suitable apertures 44 and 45 in the cylinder heads and angle irons respectively.

The piston rod 46 of the cylinder is connected to the cross head 47 of the movable rack frame. As shown in Figs. 6 and 7 the rear end portion of the piston rod may be reduced as at 48 and located through a suitable opening in the cross head 47, a nut 49 being placed upon the outer screw threaded end of said reduced portion of the piston rod.

A spaced pair of rack bars 50 are connected at their rear ends to the cross head 47 as by the bolts 51 thus forming a rack frame movable relative to the cylinder.

The rack bar frame is slidably mounted within the carriage, the rack bars 50 meshing with the pinions 31 and sliding upon the flanged rollers 32 and the angle irons 33.

A hydraulic pump 52, of any usual and well known construction, may be driven by the engine 37 for pumping oil to the cylinder, and a four-way valve 53 may be provided in the oil line for controlling operation of the cylinder.

By means of sprocket and chain, or other well known gearing, mounted within the gear housing 54, a flexible coupling 55 may be driven by the engine, and a spiral drill rod, of any usual or ordinary construction, as indicated at 56, may be detachably connected to said coupling.

In the operation of the machine, when the engine is operated the drill rod 56 is rotated through the gearing in the gear housing 54 and with the four-way valve 53 positioned to pump oil to the forward or right hand end of the cylinder, as viewed in the drawings, the piston rod 46 will be forced rearward or to the left, moving the rack bar 50 rearward or to the left and rotating the shaft 27, through the pinions 31, in clockwise direction.

The sprocket wheels or gears 29, which are substantially twice the diameter of the pinions 31, are likewise being rotated in clockwise direction traveling upon the chain racks 30 on the stationary frame, moving the carriage and drill rod forwardly, or to the right, so as to drill into the earth or rock formation.

As the carriage thus moves forwardly, or to the right, at substantially twice the speed at which the rack bar frame moves rearwardly, or to the left, it will be seen that the rack bar frame will also be carried forwardly, or to the right, as viewed in the drawings but at a slower speed.

This action continues until the piston rod has completed the full length of its stroke at which time the carriage will have traveled to the forward or right hand end of the stationary frame while the movable rack frame will be located at a position intermediate the ends of the stationary frame. Thus the drill rod, with each operation of the machine, will have a stroke substantially twice the length of the hydraulic cylinder.

When each drill rod is driven to substantially its full length into the earth, it is disconnected from the coupling 55, and the four-way valve 53 is reversed to pump oil into the rear or left hand end of the cylinder reversing the movement of the parts and moving the carriage back to the position shown in Figs. 1 and 2, when a new length of drill rod may be connected and the machine again operated as above described. This operation may be repeated until the hole is drilled to the desired depth after which the operation of the machine is reversed and the drill rods withdrawn from the hole.

I claim:

1. A drilling machine comprising a stationary frame, spaced rack tracks upon the frame, a carriage mounted for longitudinal movement upon the frame, a shaft journalled transversely through the carriage, gear wheels upon said shaft meshing with said rack tracks, a spaced pair of pinions upon the shaft, a fluid motor including a cylinder rigidly mounted upon the carriage and movable therewith, a piston rod in the cylinder, a rack bar frame slidably mounted in the carriage and connected to the piston rod, said rack bar frame meshing with said pinions, a prime mover mounted upon said carriage, a pump on the carriage operated by said prime mover for actuating the fluid motor, a four-way valve between the pump and the fluid motor for controlling the operation thereof, and a drill rod mounted upon the carriage and operatively connected to and rotated by the prime mover.

2. A drilling machine comprising a stationary frame, spaced rack tracks upon the frame, a carriage mounted for longitudinal movement upon the frame, a shaft journalled transversely through the carriage, gear wheels upon said shaft meshing with said rack tracks, a spaced pair of pinions upon the shaft, said gear wheels being of larger diameter than the pinions, a fluid motor including a cylinder rigidly mounted upon the carriage and movable therewith, a piston rod in the cylinder, means upon the carriage for operating the fluid motor, a rack bar frame slidably mounted in the carriage and connected to the piston rod, said rack bar frame meshing with said pinions, a drill rod connected to the carriage, and means upon the carriage for rotating the drill rod.

3. A drilling machine comprising a stationary frame having longitudinal guide grooves therein, spaced rack tracks upon the frame, a carriage having longitudinal flanges slidably located in said guide grooves whereby the carriage is mounted for longitudinal movement upon the frame, a shaft journalled transversely through the carriage, gear wheels upon said shaft meshing with said rack tracks, a spaced pair of pinions upon the shaft, said gear wheels being larger in diameter than the pinions, a fluid motor including a cylinder rigidly mounted upon the carriage, and movable therewith, a piston rod in the cylinder, a rack bar frame slidably mounted upon the carriage and connected to the piston rod, the rack bar frame meshing with the pinions, means on the carriage for actuating the fluid motor, a drill rod mounted upon the carriage and means upon the carriage for rotating the drill rod.

4. A drilling machine comprising a stationary, substantially horizontal frame having longitudinal guide grooves therein, spaced chains forming rack tracks upon the frame, a carriage having longitudinal flanges slidably located in said guide grooves whereby the carriage is mounted for longitudinal movement upon the frame, a shaft journalled transversely through the carriage, sprocket wheels upon the shaft meshing with said rack tracks, a spaced pair of pinions of smaller diameter than the sprocket wheels mounted upon the shaft, a fluid motor including a cylinder rigidly mounted upon the carriage and movable therewith, a piston rod in the cylinder, a rack bar frame slidably mounted upon the carriage and connected to the piston rod, rollers journalled upon the carriage and holding said rack bar frame in mesh with the pinions, a drill rod rotatably connected to the carriage at the end thereof opposite to the piston rod, and means mounted upon the carriage for rotating the drill rod and for actuating the fluid motor.

5. A drilling machine comprising a stationary, substantially horizontal frame having longitudinal guide grooves therein, spaced chains forming rack tracks upon the frame, a carriage having longitudinal flanges slidably located in said guide grooves whereby the carriage is mounted for longitudinal movement upon the frame, a shaft journalled transversely through the carriage, sprocket wheels upon the shaft meshing with said rack tracks, a spaced pair of pinions of smaller diameter than the sprocket wheels mounted upon the shaft, a fluid motor including a cylinder rigidly mounted upon the carriage and movable therewith, a piston rod in the cylinder, a rack bar frame slidably mounted upon the carriage and connected to the piston rod, rollers journalled upon the carriage and holding said rack bar frame in mesh with the pinions, a drill rod rotatably connected to the carriage at the end thereof opposite to the piston rod, a prime mover mounted upon the carriage, means operatively connecting the prime mover to the drill rod for rotating the drill rod and means operated by the prime mover for actuating the fluid motor.

VINCENT J. McCARTHY.